Patented Apr. 24, 1928.

1,667,225

UNITED STATES PATENT OFFICE.

ALFRED THAUSS, OF COLOGNE-DEUTZ, GUSTAV MAUTHE, OF COLOGNE-MUHLHEIM, AND ALFRED GÜNTHER, OF COLOGNE-RIEHL, GERMANY, ASSIGNORS TO GRASSELLI DYESTUFF CORPORATION, OF NEW YORK, N. Y., A CORPORATION OF DELAWARE.

MANUFACTURE OF NEW SULPHONIC DERIVATIVES OF UNSATURATED FATTY ACIDS.

No Drawing. Application filed December 21, 1926, Serial No. 156,266, and in Germany December 22, 1925.

The present invention concerns the manufacture of new unsaturated fatty acids which are aralkylated on the carbon atom.

According to the present invention the aralkyl group attaches itself immediately to the carbon chain, when aralkyl halogenides are caused to interact with the free unsaturated fatty acids, advantageously with the addition of a catalytically acting agent. Halogen acid is liberated briskly above 100° C. and when the evolution has ceased slightly coloured or colourless oils remain which are more or less viscous according to the nature of the fatty acid employed.

These new products are of technical importance and have found application for the manufacture of new sulphonic acids. Sulphonating agents easily convert the said aralkylated unsaturated fatty acids into water soluble sulphonic acids, which are found to be possessed of very desirable wetting and solvent properties and thus capable of manifold application in dyeing and printing. They are in the shape of their alkali metal salts yellowish products, which are soluble in water. They likewise facilitate the production of even dyeings and ensure homogeneity throughout the fibre or fabric.

Owing to the beneficial properties of the new sulphonic acids they can moreover be employed as substitutes for Turkey red oil and offer many advantages. Thus, for example, the dissolving of the oxynaphthoic acid arylides is accelerated, whilst the solutions are rendered more stable.

282 parts by weight of oleic acid, 253 parts by weight of benzyl chloride and 5 parts by weight of zinc chloride are heated with stirring to about 150° C. Reaction sets in with brisk evolution of hydrochloric acid. After one to two hours the condensation is complete. The product thus obtained is a viscous slightly yellowish coloured oil.

50 parts by weight of the product thus obtained are stirred together with 140 parts by weight of sulphuric acid monohydrate and after some time sulphonation is effected with 30 parts by weight of chlorosulphonic acid, care being taken that the sulphonating mixture is maintained as cold as possible. When the sulphonation is complete the mass is poured on to 60 parts of ice, when two layers are obtained. The lower layer consists of dilute sulphuric acid and is withdrawn, the remaining oil is dissolved in 400 parts of water and any turbidity produced is eliminated by extraction with ether. The clear solution is neutralized by 150 parts by weight of caustic soda lye of 34° Bé. and evaporated to dryness. The sodium salt of the benzylated sulpho-oleic acid is obtained in the form of a slightly yellowish coloured powder. It is very easily soluble in water from which it is precipitated neither by acetic acid nor by dilute mineral acids and is also very difficultly salted out with common salt and only imperfectly. The solution in acetic acid is a good precipitant of gelatin.

The reactions which take place may be tentatively formulated as follows:

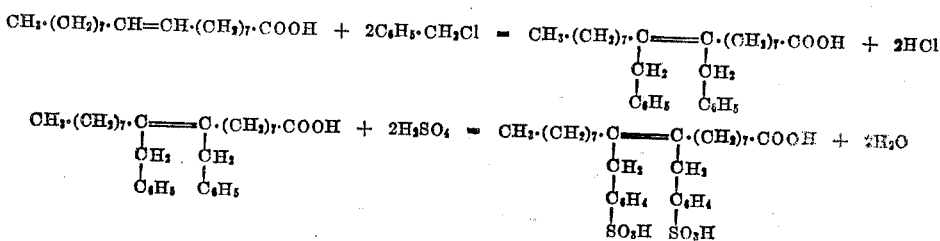

The invention, however, is not dependent upon any theory as to the course of the reactions or as to the nature of the products except as defined in the appended claims.

In the following claims the term "aralkylated derivatives of unsaturated fatty acids" is intended to denote compounds in which an aralkyl radical is attached to a carbon atom of an unsaturated fatty acid by means of an alkyl group of the aralkyl residue.

We claim:—

1. A process for making sulphonic acids of unsaturated fatty acids aralkylated on a carbon atom which comprises reacting an aralkyl halogenide with an unsaturated fatty acid and treating the resultant product with a sulphonating agent.

2. A process for making sulphonic acids of unsaturated fatty acids aralkylated on a carbon atom which comprises reacting an aralkyl halogenide with an unsaturated fatty acid in the presence of a catalytic salt of an amphoteric metal and a strong acid and treating the resultant product with a sulphonating agent.

3. A process for making sulphonic acids of unsaturated fatty acids aralkylated in a carbon atom which comprises reacting an aralkyl chloride on an unsaturated fatty acid and treating the resultant product with a sulphonating agent.

4. A process for making sulphonic acids of unsaturated fatty acids aralkylated on a carbon atom which comprises reacting an aralkyl chloride with an unsaturated fatty acid in the presence of a catalytic salt of an amphoteric metal and a strong acid and treating the resultant product with a sulphonating agent.

5. A process for making a sulphonic acid of an unsaturated fatty acid benzylated on a carbon atom which comprises reacting benzyl chloride with oleic acid and treating the resultant product with a sulphonating agent.

6. A process for making a sulphonic acid of an unsaturated fatty acid benzylated on a carbon atom which comprises reacting benzyl chloride with oleic acid in the presence of a catalytic salt of an amphoteric metal and a strong acid and treating the resultant product with a sulphonating agent.

7. A process for making a sulphonic acid of an unsaturated fatty acid benzylated on a carbon atom which comprises reacting benzyl chloride with oleic acid in the presence of zinc chloride and treating the resultant product with a sulphonating agent.

8. As new products, sulphonic acids of aralkylated derivatives of unsaturated fatty acids, the alkali metal salts of which are yellowish substances soluble in water and which have an extraordinarily high wetting action on animal and vegetable fibers even in very dilute aqueous solution.

9. As a new product, the herein described sulphonic acid of benzylated oleic acid, the sodium salt of which is a slightly yellowish powder easily soluble in water to a substantially colorless solution, and which has an extraordinarily high wetting action on textile fibers in neutral alkaline and acid solutions.

In testimony whereof we have hereunto set our hands.

ALFRED THAUSS.
GUSTAV MAUTHE.
ALFRED GÜNTHER.